Sept. 17, 1963   J. ROBB   3,103,791
STORAGE VESSEL FOR LIQUEFIED GASES
Filed Nov. 2, 1961
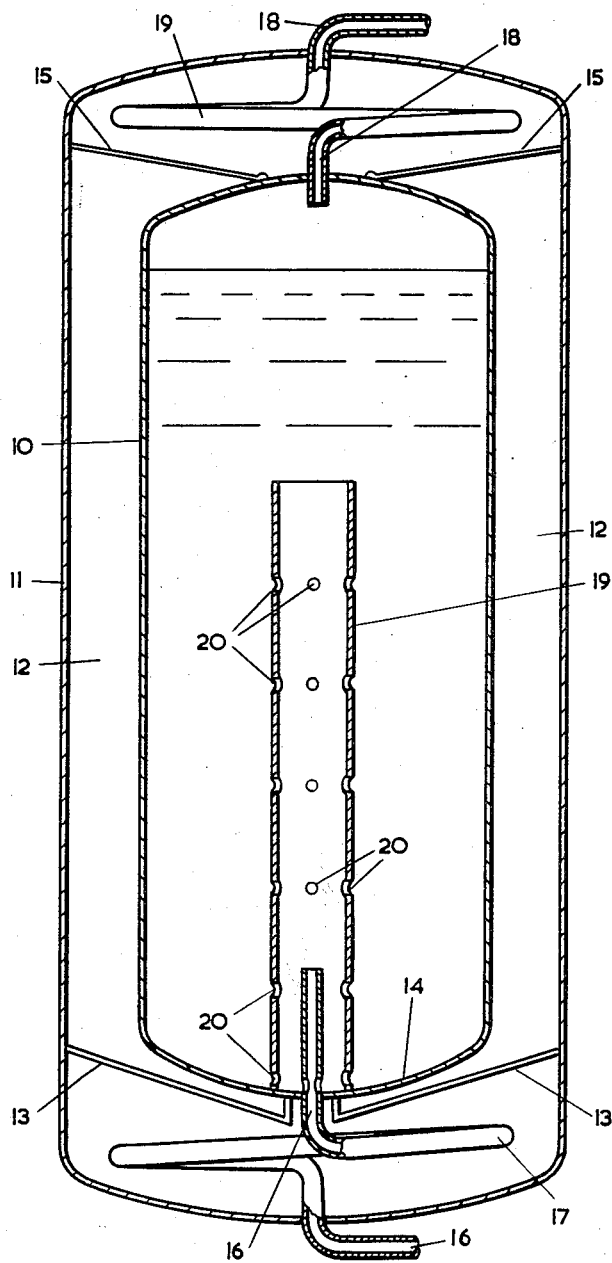
INVENTOR
James Robb
BY Aaron R. Townshend
ATTORNEY United States Patent Office 3,103,791
Patented Sept. 17, 1963

3,103,791
STORAGE VESSEL FOR LIQUEFIED GASES
James Robb, Carshalton, Surrey, England, assignor to The British Oxygen Company Limited, a British company
Filed Nov. 2, 1961, Ser. No. 149,727
Claims priority, application Great Britain Nov. 2, 1960
2 Claims. (Cl. 62—45)

This invention relates to a storage vessel for low boiling point liquids, particularly liquefied gases, and has for its object to provide an improved heat-insulated vessel in which adverse effects due to the phenomenon known as "stratification" are obviated or minimized.

When pressure is allowed to build up in a heat-insulated storage vessel newly charged with liquefied gas, by preventing escape of vaporized gas from the vessel except by opening of a safety valve at a predetermined high pressure, it is usual for vapor pressure within the vessel to rise more rapidly than would be expected in theory having regard to data concerning the rate of heat inleak to the contents of the vessel and to the thermal capacity of the contents.

This rapid vapor pressure increase is due to the development of a temperature gradient through the mass of liquid, the temperature at the surface of the mass being higher than the temperature towards and at the bottom, and it is this higher temperature at the surface which determines the vapor pressure in the vessel.

This is the phenomenon known as "stratification," and it is undesirable in that at least one adverse effect attributable thereto is excessive wastage of the contents of the vessel as the rapid vapor pressure increases cause premature lifting of the abovementioned safety valve. Stratification is a phenomenon which can be present to greater or lesser degree in a recently-charged storage vessel until such time as a "stable" state of equilibrium is reached, i.e. when the whole mass of liquefied gas is at a uniform temperature which is the temperature at which it boils under the conditions of pressure to which it is subjected.

An important cause of stratification is heat inleak into the part of the vessel which is above the level of the liquid surface. This produces a temperature gradient and results in heat being conducted down the sides of the vessel to the liquid in the region of the surface. If this heat inleak occurs at a rate greater than that required to evaporate the liquid in order to produce the required internal pressure, it is possible for the liquid to acquire a very steep temperature gradient between the surface layer and the main body of liquid.

It is heat inleak to the mass of liquefied gas in the vessel which raises its temperature with the possibility of stratification occurring, and since the vessel is heat-insulated the majority of this heat inleak takes place across the heat-insulation via such path or paths of least resistance as may be available. It will be realized that some such path or paths are bound to be present in the construction of any storage vessel, in the form of at least one or more conduits where the vessel consists only of an inner shell enclosed by heat-insulating material, and in the form of at least one or more conduits plus supporting members where the vessel consists of an inner shell spaced within an outer shell and supported from the latter, with some form of heat-insulation between the two shells. Hereafter such conduits and supporting members are referred to as "elements which cross the heat-insulation."

According to the present invention, in a storage vessel for liquefied gases having an inner shell enclosed by heat-insulation, at least one element which crosses the heat-insulation and which provides a major heat inleak path is connected with the inner shell at a regional area thereof in the proximity of its base, and an upstanding convection chimney within the inner shell is connected thereto by one end to extend upwardly from said regional area.

There may be several regional areas in the proximity of the base of the inner shell, each having a convection chimney extending upwardly therefrom within the inner shell, and each having connected thereto one or more elements which cross the heat insulation and provide major heat inleak paths.

The term "convection chimney" means a tube having holes therein spaced throughout its length.

An embodiment of the invention will now be described with reference to the accompanying drawing, which is a diagram depicting a sectional side elevation of a liquid gas storage vessel constructed according to the invention.

Referring to the drawing, the vessel comprises an inner shell 10 enclosed within an outer shell 11 with an interspace 12 between the two shells. The interspace 12 may be evacuated, so that it serves as heat-insulation, or it may contain heat-insulating material in powder or other form as well as being evacuated, this provision of heat-insulation being well-known in liquid gas storage vessel for reducing heat inleak as far as is possible.

The inner shell 10 is supported from the outer shell 11 by main support members 13, two of which are shown in the drawing, and it will be noted that said support members 13 extend from the side wall of the outer shell 11 and across the heat-insulation to be connected with the inner shell 10 at a regional area thereof which is central of the base 14 of the inner shell.

At the upper end of the vessel the spacing between the inner shell 10 and the outer shell 11 is maintained by bracing members 15, which are neither so strong nor so heavy as the main support members 13, since the latter support the weight of the inner shell 10 and its contents, while the members 15 merely act to steady the inner shell.

A liquid gas draw-off conduit 16 extends from the center of the base of the inner shell 10 across the space 12 between the inner and outer shells, and passes through the outer shell 11 to the exterior of the vessel. Within the space 12 between the shells 10 and 11, the conduit 16 is looped at 17, as is customary to restrict heat-inleak via said conduit 16 by reason of the great length of the loop 17. A vaporized gas draw-off conduit 18 extends from the center of the top of the inner shell 10 across the space 12 between the inner and outer shells, and passes through the outer shell 11 to the exterior of the vessel.

Within the space 12 between the shells 10 and 11, the conduit 18 is looped at 19 in the usual way to restrict heat inleak. The conduit 18 may conveniently be provided with a pressure relief valve (not shown) the purpose of which has already been mentioned.

With the construction so far described, it will be noted that the main support members 13 and the liquid draw-off conduit 16, all being elements which cross the heat-insulation of the storage vessel, are all connected with the inner shell 10 at a regional area thereof in the center of its base 14, i.e. a regional area which is small in relation to the base 14 as a whole. It will be further noted that the main support members 13 constitute individual heat inleak paths which as such are more effective than the heat inleak paths due to the top bracing members 15 because of the greater strength and weight of the members 13, and also because the main support members 13 make contact with the inner shell 10 at the base 14 the inner surface of which is in contact with the liquid contents, while the bracing members 15 contact the inner shell at the top region, the inner surface of which is not in contact with the liquid contents but only with the gas space above the liquid level. The main support members 13 all contact the base 14 of the inner shell 10 in a regional area at the center of the base, so that collectively they provide a heat inleak path to said regional area, and therefore considering the members 13 either individually or collectively, each or all provide a major heat inleak path to the inner shell 10 in comparison with the top bracing members 15. Similarly the liquid gas draw-off conduit 16 also provides a major inleak path in comparison with either the vaporized gas draw-off conduit 18 or the top bracing members 15.

It is therefore apparent that heat inleak to the inner shell 10 is concentrated in the regional area in the center of the base 14 contacted by the main support members, and in combination with this structural feature is provided a convection chimney 19 upstanding from said regional area and within the inner shell 10, the chimney 19 being provided with holes 20 spaced apart throughout its length.

The invention minimizes or prevents the phenomenon of stratification from occurring by producing convection currents in the liquid gas upwardly within the chimney 19, due to the concentration of heat inleak at the regional area of the base 14 at the bottom of the chimney, and downwardly outside the chimney with radially inward flow through the holes 20 in the chimney at the bottom region thereof.

Heat inleak at the top of the vessel, i.e. via the top bracing member 15 and the conduit 18, can be minimized by constructing the inner shell 10 from material of low thermal conductivity.

In a useful alternative construction embodying the present invention, heat inleak is not concentrated in a single regional area in the center of the base, but in several regional areas all in the proximity of the base, each said area having a convection chimney extending upwardly therefrom within the inner shell. For example the inner shell may be supported from the outer shell by a tripod structure, with three convection chimneys above the points of support.

In all cases, in order that the full benefits of the invention may be realized, it is desirable that heat inleak to the top of the vessel should be kept to as small an amount as possible, i.e. there should be no avoidable heat inleak to the upper part of the vessel.

I claim:

1. In a storage vessel for liquefied gas of the class comprising an inner shell surrounded by heat-insulation and at least one element which crosses said heat-insulation and is connected to said inner shell, the combination with said inner shell of an internal convection chimney upstanding from a regional area encircling the point of connection between said element and said inner shell in the proximity of its base, said element which crosses the heat-insulation being connected by its innermost end within said regional area defined by said chimney within the inner shell.

2. In a storage vessel for liquefied gas of the class comprising an inner shell connected with an outer shell by elements such as support members and conduits and with heat-insulation between the two shells, the combination with such inner shell of an internal convection chimney connected with said inner shell and upstanding from a regional area of said inner shell in the proximity of its base, support members for the base of the inner shell and a liquid draw-off conduit, all connected with said inner shell at said regional area.

References Cited in the file of this patent
UNITED STATES PATENTS

| | | |
|---|---|---|
| 2,974,496 | Pastuhov et al. | Mar. 14, 1961 |
| 2,998,708 | Skinner | Sept. 5, 1961 |